(12) United States Patent
Parker et al.

(10) Patent No.: US 8,117,521 B2
(45) Date of Patent: Feb. 14, 2012

(54) IMPLEMENTATION OF RECYCLING UNUSED ECC PARITY BITS DURING FLASH MEMORY PROGRAMMING

(75) Inventors: Allan Parker, Austin, TX (US); Tan Tat Hin, Penang (MY); Murni Mohd-salleh, San Jose, CA (US); Edward V. Bautista, Jr., Sunnyvale, CA (US)

(73) Assignee: Spansion LLC, Sunnyvale, CA (US)

( * ) Notice: Subject to any disclaimer, the term of this patent is extended or adjusted under 35 U.S.C. 154(b) by 841 days.

(21) Appl. No.: 12/198,381

(22) Filed: Aug. 26, 2008

(65) Prior Publication Data

US 2010/0058151 A1    Mar. 4, 2010

(51) Int. Cl.
*G06F 11/00* (2006.01)

(52) U.S. Cl. .................................................. 714/785

(58) Field of Classification Search .................. 714/785
See application file for complete search history.

(56) References Cited

U.S. PATENT DOCUMENTS

| 5,889,792 | A | 3/1999 | Zhang et al. |
| 6,526,537 | B2 | 2/2003 | Kishino |
| 2009/0187803 | A1 * | 7/2009 | Anholt et al. ................. 714/752 |

* cited by examiner

*Primary Examiner* — Bryce Bonzo
(74) *Attorney, Agent, or Firm* — Eschweiler & Associates, LLC (57) ABSTRACT

Methods for recycling unused error correction code (ECC) during flash memory programming, comprise generating ECC from user data to form a syndrome and storing the syndrome into volatile memory. ECC is re-encoded corresponding to the syndrome read from the memory with new user data. Re-encoding ECC comprises comparing new ECC with the most recent ECC of the previous syndrome, correcting a bit error in the new ECC, and indicating if the new ECC has failed.

20 Claims, 6 Drawing Sheets

| | D3 | D2 | D1 | D0 | ECC stored | ECC new | ECC inhibit |
|---|---|---|---|---|---|---|---|
| Initial PGM | 0xFFFF | 0xFFFF | 0x1234 | 0x5678 | 0x7F | 0x77 | No |
| Second PGM | | 0x9ABC | | | 0x77 | 0x13 | No |
| Last PGM | 0xDEF0 | | | | 0x13 | 0x1F | Yes |

IMPLEMENTATION OF RECYCLING UNUSED ECC PARITY BITS DURING FLASH MEMORY PROGRAMMING

FIELD OF THE INVENTION

The present invention relates generally to memory devices and the like, and in particular, to a system and methods for recycling error correction code.

BACKGROUND OF THE INVENTION

Various memory types and approaches exist to both program and erase data for computers, PDAs, digital cameras, telephone systems, flash drives, audio devices, video equipment, and the like. For example, random access memory (RAM), dynamic random access memory (DRAM), static random access memory (SRAM), read only memory (ROM), programmable read only memory (PROM), electrically erasable programmable read only memory (EEPROM), flash memory, and the like, are all presently available to provide data storage capability.

Each memory type has particular advantages and disadvantages associated with it. For example, DRAM and SRAM, both volatile memory, have the advantage of allowing individual bits of data to be erased, one at a time, but such data is lost when power is removed from the memory device. EEPROM, alternatively, can be erased but has reduced data storage density, lower speed, and higher cost than DRAM and SRAM. EPROM, in contrast to EEPROM, is less expensive and has greater packing density but is more difficult to erase.

Flash memory (non-volatile) was developed in the late 1980's, originating from EPROM (read only memory) and has become popular as it combines the advantages of the high packing density and the low cost of EPROM with the erasing ease of EEPROM. Flash memory is, for example, programmable, erasable, stores data in an array of floating gate transistors or cells, is re-writable and can hold its memory contents when power is removed from the device (nonvolatile memory). The charge level determines whether or not a flash memory cell turns "on" or "off" when a read voltage level is applied to a control gate of the cell. Flash memory is utilized in many portable electronic products, such as cell phones, laptop computers, voice recorders, MP3 players, cameras, PDAs, and the like, as well as in many large electronic systems, such as, planes, cars, locomotives, industrial control systems, etc. Flash memory is characteristically erasable and programmable in sectors of memory referred to as multi-bit blocks. A whole block of memory cells can be erased in a single action, or in a flash, which may have been how the device got its name. Programming is a technique for changing memory cell data from a logical "1" (erased state) to a logical "0" (programmed state) in a flash memory cell array. There are two schemes of programming flash memory, single-byte (word programming) and buffer programming. Some devices support, for example, the single byte/word method, or the buffer programming method, or both.

The erase, program, and read operations are commonly performed by application of appropriate voltages to certain terminals of the memory cell. In an erase or write operation the voltages are applied so as to cause a charge to be removed or stored on the floating gate within the memory cell, respectively. In a read operation, appropriate voltages are applied so as to cause a current to flow in the cell, wherein the determined amount of such current is indicative of the value of the data stored in the cell. The memory device includes appropriate circuitry to sense the resulting cell current in order to determine the data stored therein, which is then provided to data bus terminals of the device for access by other devices in a system in which the memory device is employed.

In a NOR architecture configuration, the control gate is connected to a wordline associated with a row of memory cells which together with other rows of cells form sectors of such memory cells. In addition, the drain regions of various cells are connected together by conductive bitlines. The channels of the various cells conduct current between the source and the drain in accordance with an electric field developed in the channel by the stacked gate structure. Respective drain terminals of the transistors within a single column are connected to the same bitline. In addition, respective flash cells associated with a given bitline have stacked gate terminals coupled to a different wordline, while all the flash memory cells in the array generally have their source terminals coupled to a common source terminal. In operation, individual flash cells are addressed via the respective bitline and wordline using the peripheral decoder and control circuitry for programming (writing), reading or erasing functions.

By way of further detail, the single bit stacked gate flash memory cell is programmed by a suitable mechanism, such as channel hot electron injection (CHE). Programming with CHE injection involves applying a relatively high voltage to the control gate and connecting the source to ground and the drain to a predetermined potential above the source but typically below the control gate voltage. When a resulting electric field is high enough, electrons collect enough energy to be injected from the source onto the floating gate. As a result of the trapped electrons, the threshold voltage of the cell increases, the voltage required to switch a MOSFET from a blocking state to a conducting state is increased. This change in the threshold voltage (and thereby the channel conductance) of the cell created by the trapped electrons is what causes the cell to be programmed.

In order to erase a typical single bit, stacked gate, flash memory cell, a relatively high voltage is applied to the source (e.g., +5 volts), and the control gate is held at a high negative potential (e.g., −10 volts), while the drain is allowed to float. Under these conditions, a strong electric field is developed across the tunnel oxide between the floating gate and the source. The electrons that are trapped in the floating gate flow are forced into the source region by way of Fowler-Nordheim tunneling through the tunnel oxide. As the electrons are removed from the floating gate, the cell is erased or set to "1".

For a read operation, a certain voltage bias is applied across the drain to source of the cell transistor. The drain of the cell is connected to a bitline, which may be connected to the drains of other cells in a byte or word group. A source read voltage is applied at the source and a drain read voltage (greater than the source read voltage) is applied at the drain. A read gate voltage is then applied to the control gate (e.g., by way of the wordline) of the memory cell transistor that is greater than the drain read voltage in order to cause a current to flow from the drain to source. The read operation gate voltage is typically applied at a level between a programmed threshold voltage (Vt) and an un-programmed threshold voltage. The resulting current is measured, by which a determination is made as to the data value stored in the cell.

Another type of flash memory is dual bit memory, which allows multiple bits of data or information to be stored in a single memory cell. In this technology, a memory cell is essentially split into two dual or complementary bits, each of which is formulated for storing one of two independent pieces of data. Each dual bit memory cell, like a traditional single bit cell, has a gate with a source and a drain. However, unlike a traditional stacked gate cell in which the source is always connected to an electrical source and the drain is always connected to an electrical drain, respective dual bit memory cells can have the connections of the source and drain reversed during operation to permit the addressing of the two bits.

As with many aspects of the semiconductor industry, there is a continuing desire to scale down device dimensions to achieve higher device packing densities on semiconductor wafers. Similarly, increased device speed and performance are also desired to allow more data to be stored on smaller memory devices, and quicker access to that data, etc. Accordingly, there are ongoing efforts to, among other things, increase the number of memory cells that can be packed on a semiconductor wafer (or die).

While flash memory offers a variety of benefits to the end user as discussed supra, employing flash memory also gives rise to several additional problems. Flash memory typically has a long programming and erasing time. The programming of a memory cell can often take milliseconds to reach a required charge level on the floating gate on the transistor. In addition, over-erasing often negatively impacts flash memory because an excessive charge is removed from the floating gate of the memory cell. Corrective programming often has to be employed to mitigate the damage caused by over-erasing.

Computer memories can make errors occasionally due to voltage spikes on the power line or other causes. To guard against such errors, some memories use error-detecting or error-correcting codes (ECC). When these codes are used, extra bits are added to each memory word in a special way. When a word is read out of memory, extra bits are checked to see if an error has occurred. Therefore, with the massive amount of data produced and stored each year, reliable storage and retrieval of information is more crucial than ever. Robust coding and decoding techniques are critical for correcting errors and maintaining data integrity.

In view of the foregoing, a need exists for an improved method of detecting and correcting errors in data blocks, increasing the reliability of memory cells and sector reading, decreasing the power consumed during erasing operation, and other factors to become apparent in this disclosure.

SUMMARY OF THE INVENTION

The following presents a simplified summary in order to provide a basic understanding of some aspects of the invention. This summary is not an extensive overview. It is intended neither to identify key or critical elements of disclosure nor to delineate the scope of the disclosure. Rather, the primary purpose of this summary is to present some concepts in a simplified form as a prelude to the more detailed description that is presented later. The invention provides methods and apparatus by which the above shortcomings associated with a multiplicity of sector select circuits can be mitigated or overcome.

In accordance with one aspect of the present disclosure, a method for recycling error correction code (ECC) during flash memory programming, comprises calculating a first ECC syndrome from a first user data, storing the syndrome with the first user data into a memory as stored data, and calculating a second ECC syndrome from both the stored data and a second user data. The method further comprises comparing the second syndrome with the first syndrome, determining if the first syndrome is able to be recycled based upon the comparison, and selectively re-encoding the first ECC syndrome if determined that the first syndrome is able to be recycled.

In another embodiment of the present disclosure, a method of recycling unused error correction code (ECC) bits during flash programming, comprises programming a first data into first ECC parity bits to form a stored data block and selectively re-encoding the first ECC parity bits based on the most recently stored data block and a second data.

In yet another embodiment of the present disclosure, a communication device, comprises a flash memory CPU, a flash memory operatively coupled to the flash memory CPU and configured to transfer data to and from the flash memory CPU. An input component for is for entering the data and a display component is for displaying information. The communication device further comprises a plurality of switches, flash memory, and a method of recycling unused ECC during flash programming. The method comprises calculating a first ECC syndrome from a first user data, storing the syndrome with the first user data into a memory as stored data, and calculating a second ECC syndrome from both the stored data and a second user data. The method further comprises comparing the second syndrome with the first syndrome, determining if the first syndrome is able to be recycled based upon the comparison, and selectively re-encoding the first ECC syndrome if determined that the first syndrome is able to be recycled.

To the accomplishment of the foregoing and related ends, the following description and annexed drawings set forth in detail certain illustrative aspects and implementations of the disclosure. These are indicative of but a few of the various ways in which the principles disclosed may be employed. Other objects, advantages and novel features of the invention will become apparent from the following detailed description when considered in conjunction with the drawings.

DETAILED DESCRIPTION OF THE INVENTION

One or more implementations of the present invention will now be described with reference to the drawings, wherein like reference numerals are used to refer to like elements throughout. In some instances, the terminology and symbols may imply specific details that are not required to practice the invention. For example, the interconnection between circuit elements or circuit blocks may be shown or described as multi-conductor or single conductor single lines. Each of the multi-conductor signal lines may alternatively be single conductor signal lines, and each of the single conductor signal lines may alternatively be multi-conductor signal lines. Signals and signaling paths shown or described as being single ended may also be differential, and vice-versa. The present disclosure is directed to a variety of error correcting techniques implementing recycled ECC chunk to detect errors in a previously corrected data block.

The use of simple Hamming codes to detect and correct data corruption that occurs during normal single-level cell (SLC) NAND flash memory operation is common and an industry-accepted method for error detection and correction in many SLC NAND Flash based applications. NAND Flash devices often use a couple of different memory cell technologies. One design uses a traditional implementation, wherein each memory cell represents a single bit of data or the SLC approach. Another design is to program each cell in incremental amounts. In this approach, how much or how hard a cell is programmed determines the data value of the cell and is called the multi level cell (MLC) approach. With the MLC approach each cell represents 2 bits of data. SLC NAND Flash devices can provide improved data integrity when compared with MLC NAND Flash devices because the data integrity in MLC requires more sophisticate error correction scheme than is used for SLC NAND Flash devices. However, the methods for implementation of recycling unused ECC parity bits during flash memory programming are not limited to any specific type of SLC or MLC Flash device, nor are they limited to any specific error correction scheme. Hamming codes illustrated and discussed herein are meant to demonstrate the method contemplated by the disclosure and not to limit the methods to any one specific device and/or to any one specific error correcting and/or detecting scheme.

Figure 1:
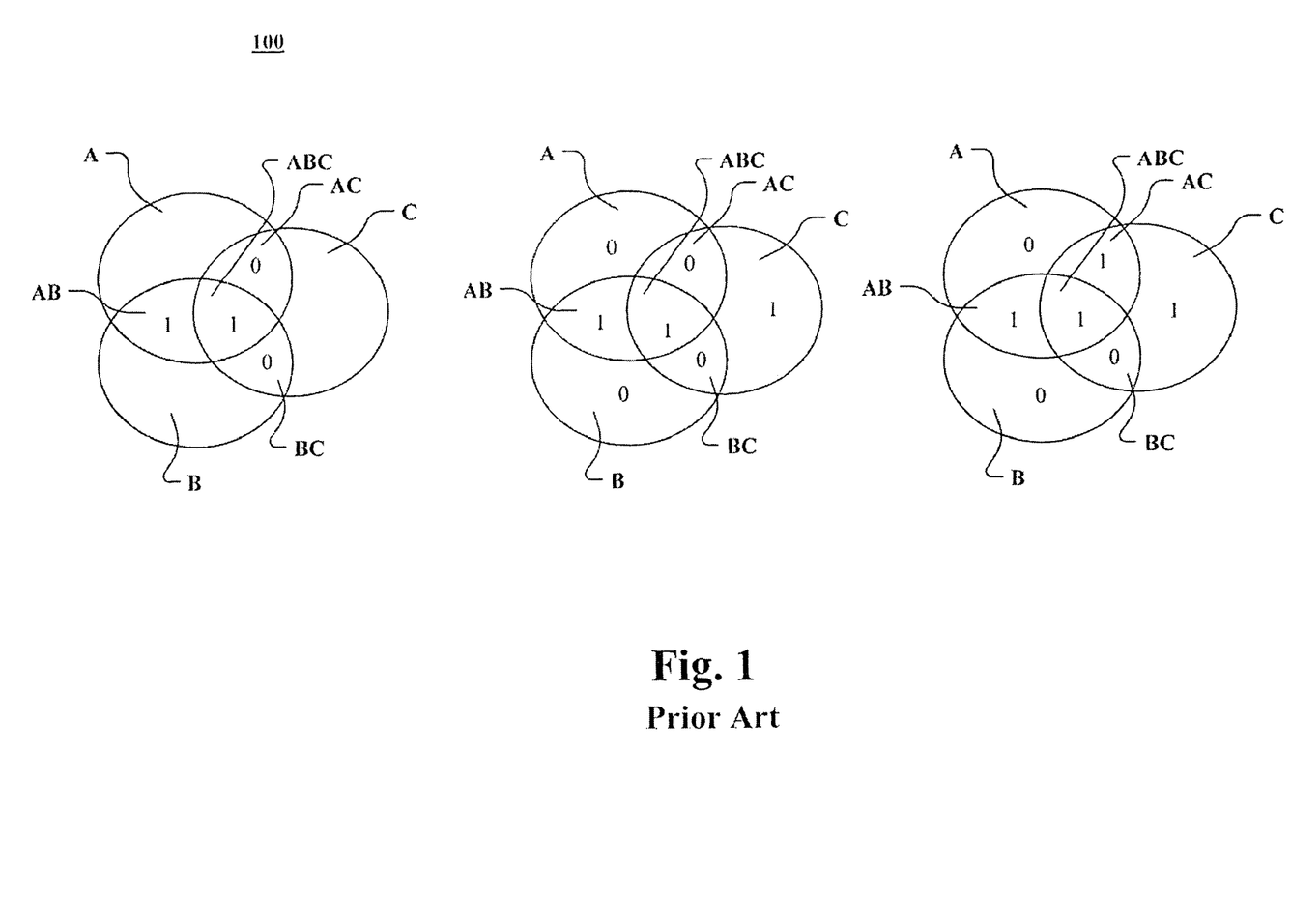
FIG. 1 is an illustration of an error correcting code for 4-bit words in accordance with a basic method of prior art.

Illustrated in FIG. 1 are conventional Venn diagrams to depict a simple graphical representation of the idea of an error correcting code for four bit words. The Venn diagram of FIG. 2-14(a) contains three circles labeled A, B, and C, which combined form seven regions. Regions A, B, and C are the outermost regions and region ABC is the innermost region. AB, AC, and BC each represent the other three regions. A 4-bit memory word of 1100 is encoded in the regions AB, ABC, AC, and BC, with one bit per region.

In the middle diagram of FIG. 1, a parity bit to each of the three empty regions is added to produce an even parity. Parity bits are appended to the data and are chosen so as to have the number of '1' bits in the syndrome or codeword to be even or odd for any particular detection/correction technique. Adding parity bits to make the number of bits a predetermined odd or even number is used for the purpose of identifying whether the bits being transferred from memory arrived successfully. Before the bits are sent, they are counted and if the total number of data bits is even, the parity bit will be set so that the total number of bits will form an odd number. For example, the sum of the bits in each of three circles A, B, and C, is an even number. In circle A of the middle diagram of FIG. 1, four number, 0, 0, 1, 1, all add up to 2, which is even and likewise for circles B and C. In this simplified scheme all circles happen to be the same, however alternative sums are also possible, such as 0 and 4 for example. The syndrome in FIG. 1 corresponds with 4 data bits and 3 parity bits.

The third diagram on the far right of FIG. 1 illustrates the same bits that have been transferred for a memory operation but arrived with error wherein the AC region has gone bad by changing from a 0 to a 1. Because the count is odd instead of even, the computer can see at the receiving end that circles A and C have the wrong parity, odd instead of the original even. A transmission error has occurred and either transmission is retried, repaired, or the system halts and an error message is sent to the user. The only single bit change that corrects them is to restore AC back to 0.

A computer may detect and correct single bit errors by using an even or odd parity but this way of checking is not infallible since it is possible to have two bits in error in a transmission, thereby offsetting one another. This possibility fortunately is remote in personal computers, however in more complex and denser data systems where reliability and integrity is desired additional bits are allocated of parity checking. Alternatively, no parity may be used where systems, such as modems may not check or transmit parity bits in lieu of other forms of checking errors in transmission. The advantage of no parity is that the parity bits can be used for data, and therefore speed up transmission.

Different algorithms may be implemented as various coding schemes such as Hamming code, BCH (Bose, Chaudhuri, Hocquenghem) code, or Reed-Solomon code. For example, the ECC method using Hamming codes with predetermined bits is able to detect a 2-bit error (i.e., two error bits) and to correct single bit errors. A method using Hamming codes, therefore functions to detect 2-bit errors and correct a 1-bit error.

Figure 2:
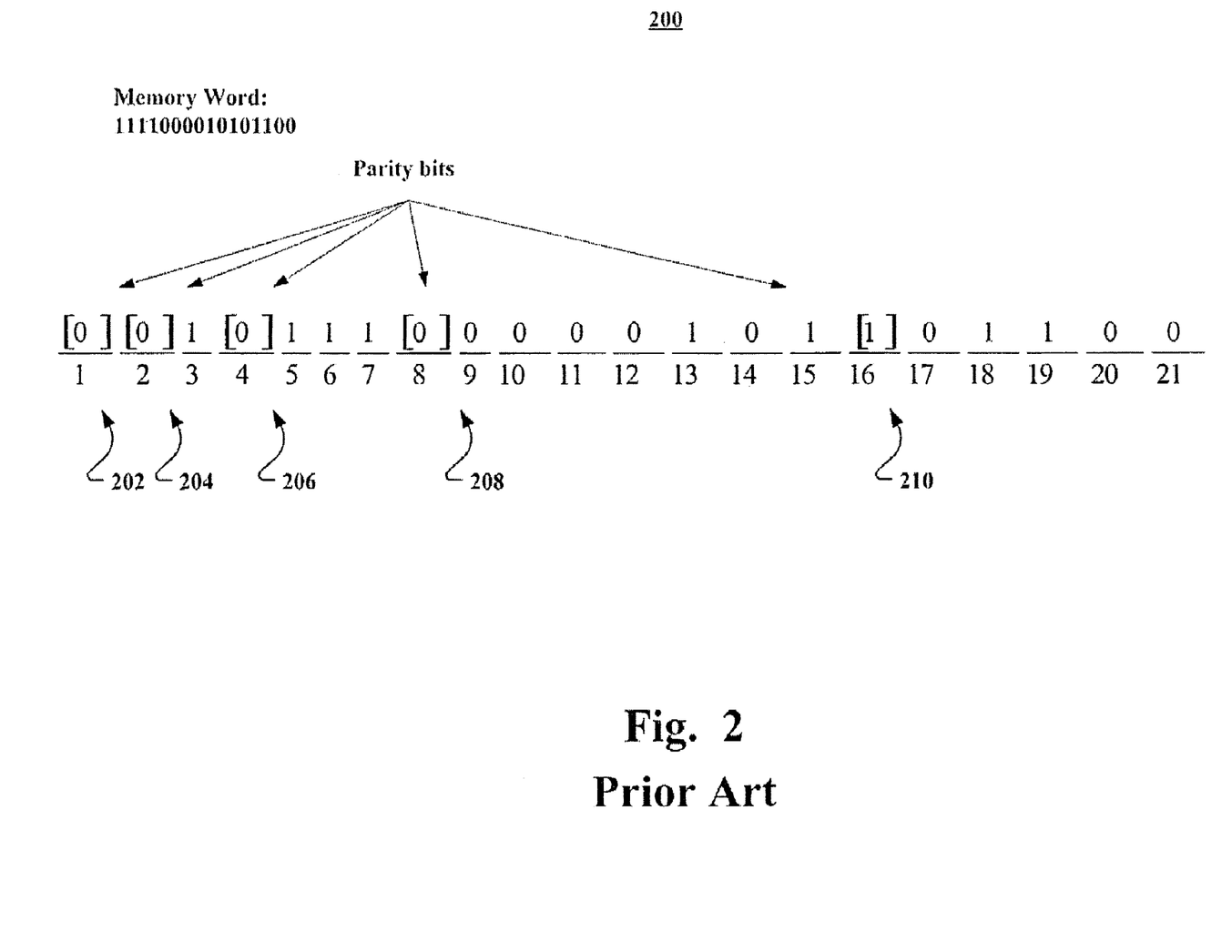
FIG. 2 is an illustration of an application of a Hamming algorithm in accordance with prior art.

Referring now to FIG. 2 is an illustration of example of how the Hamming algorithm can also be used to construct error correction codes (ECC) for any size memory word. For example, if a number of x parity bits are added to an m-bit word, a new word is formed in a Hamming code that is a length of x+m bits. The bits are numbered starting at 1, not 0, with the first bit 1 the leftmost, highest order bit. All bits whose bit number is a power of 2 are then parity bits while the rest are used as data bits. For example, with a 16 bit word, 5 parity bits are added when ECC is generated by the Hamming algorithm to comprise a 21 bit word. Therefore, bits 1, 2, 4, 8, and 16 are parity bits in the example of FIG. 2 and the rest are data bits. Even parity is arbitrarily chosen in this example. Therefore, each parity bit checks specific bits positions and is set so that the total number of 1s in the checks positions is even. For example, the bit positions checked by the parity bit 1 checks bits 1, 3, 5, 7, 9, 11, 13, 15, 17, 19, and 21. Bit 2 checks bits 2, 3, 6, 7, 10, 11, 14, 15, 18, and 19. Bit 4 checks bits 8, 9, 10, 11, 12, 13, 14, 15. Bit 16 checks bits 16, 17, 18, 19, 20, 21. Each bit is checked by those bits that sum total to that particular bit's number. For example, bit 5 in FIG. 2 is checked by bits 1 and 4 because 1+4=5 and likewise bit 6 would be checked by bits 2 and 4, and so on. FIG. 2 illustrates a construction of a Hamming code for the 16-bit memory word 1 1 1 1 0 0 0 0 1 0 1 0 1 1 0 0. The 21-bit codeword or syndrome is 0 0 1 0 1 1 1 0 0 0 0 0 1 0 1 1 0 1 1 0 1 1 0 0. As an example of the mechanics of error correction, if bit 5 was inverted because of a surge on the power line or something else that caused an incorrect transfer of the data, the new incorrect 21-bit codeword would be 0 0 1 0 0 1 1 0 0 0 0 0 1 0 1 1 0 1 1 0 1 1 0 0. Subsequent to verification the 5 parity bits will be checked with the following results: Parity bit 1 incorrect (1, 3, 5, 7, 9, 11, 13, 15, 17, 19, 21 contains five 1s); Parity bit 2 correct (2, 3, 6, 7, 10, 11, 14, 15, 18, 19 contains six 1s); parity bit 4 incorrect (4, 5, 6, 7, 12, 13, 14, 15, containing two 1s). Parity bit 16 correct (16, 17, 18, 19, 20, 21 contains four 1s). Parity bit 1 and 4 are incorrect because the total number of 1s should be an even number. Either by a process of elimination or adding the incorrect parity bits up will result in the only bit to have an error is bit 5. Because it was read as a 1 it should be a 0. In this manner, errors can be corrected.

Figure 3:
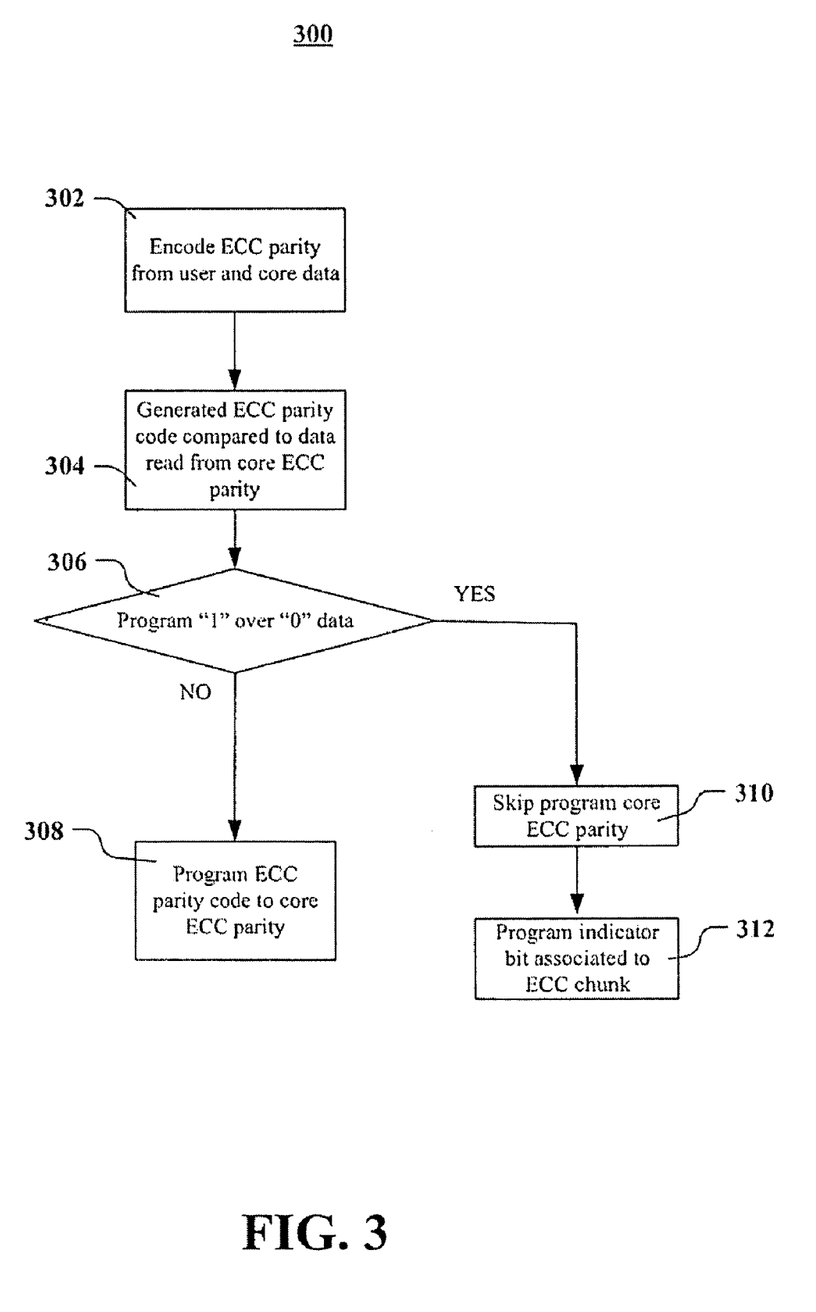
FIG. 3 is a flow chart for an exemplary method of recycling ECC, according to an aspect of the present disclosure.

Turning now to FIG. 3, is illustrated a flowchart of an improved method 300 of one embodiment of the present disclosure. In this embodiment is a method for recycling ECC that may be utilized in mobile systems or any digital system wherein memory is stored and transmitted. With the ECC recycling method of the present disclosure, ECC is re-encoded based on the most recent data block. A data block may comprise any user type data combined or not with any stored data of a memory array and ECC. Generally, two types of error correcting codes are used in the field: codes of block type and codes of convolutional type. Codes of block type as discussed supra encode a fixed number of bits, for example k bits, into a vector of specific length, n for example. The main characterization of a block code is that it is a fixed length channel code (unlike source coding schemes such as Huffman coding, and unlike channel coding methods like convolutional encoding). Therefore, the information string is divided into blocks of k-bits each. A block code takes a k-digit information word and transforms this into an n-digit codeword.

The method of FIG. 3 demonstrates an ability to re-use ECC when reasonable to do so and inhibit ECC when it no longer serves a strong purpose. For example, if a user inputs any number of bytes, and for a certain amount of bytes (i.e., block of data) an ECC word called a syndrome corresponds to it with about 9 to 24 bits used specifically to do repairs later on. However, in Flash memory once a bit is programmed or set to a zero, a '1' cannot be written or programmed to it independently without first erasing the entire array sector and then subsequently writing it back. This is a problem in particular when pieces or chunks of data are written at a time.

At 302 ECC parity is encoded from user and core data or stored data according to an ECC syndrome encoder for generating a syndrome from each word to be stored or transmitted through a channel. ECC parity is encoded from the user data and core data already stored in the particular memory array. Any channel is thought of to be a source of possible error that corrupts the data and ECC parity represented by the syndrome. For example, a channel may be a storage media (e.g., hard disk, optical disk, etc.) or a network connection (e.g., connection with other computers, or a wireless connection such as that used in satellite communications). The term channel is used to represent any source of possible error or noise as the case may be that possibly corrupts the codeword or syndrome thereby modifying it.

At 304 an encoder (not shown) generates ECC parity code, for example based on the previously corrected data block. After calculating ECC by any method scheme capable of such calculation, new ECC parity code is generated. The new ECC parity code is encoded based on the existing previous core data and new user data. The generated ECC parity code is then compared to data read from the older core ECC parity to determine which decision is implemented at 306.

At 306 whether or not the old ECC can be encoded by the new ECC is examined. A decision is made based on whether the old ECC requires a '1' to be programmed over a '0'. If the programming involves programming erased data over programmed data, the decision to program the core ECC parity in alignment to the new ECC expected data outputted from an ECC encoder is foregone. Therefore, programming any ECC parity code to the core ECC parity is skipped as demonstrated at 310 of FIG. 3 and that ECC goes abandoned.

At 310 programming the core ECC parity in alignment to the ECC parity code generated is skipped. Therefore, the decision at 306 had previously determined that data in the core ECC parity compared to the generated ECC parity code was flawed and correction could only be programmed by writing erased data over programmed data (i.e., a '0' data over a '1' data). Consequently, that particular ECC becomes inhibited.

At 312 of FIG. 3 the core ECC parity data is inhibited to prevent subsequent use of the ECC. It is no longer an option for future comparison of any new ECC outputted by an ECC encoder. The core ECC parity is therefore labeled as inhibited. The programming of an indicator bit actuates this inhibit label. The indicator bit programmed is associated to the particular ECC chunk of data and causes the ECC to be rendered abandoned for any subsequent programming.

According to another embodiment of the disclosure, if the decision at 306 determines that data in the core ECC parity compared to the generated ECC parity code was compatible by programming programmed data over erased data (i.e., a '1' data over a '0' data) then the decision flows to 308 to instigate programming the ECC parity code to the core ECC parity since the core ECC parity is able to be recycled. At 308 of FIG. 3 the new ECC parity code is programmed to the core ECC parity. One advantage of re-using ECC parity is that extra parity bits are not needed all the time and these bits can be used for data, and therefore speed up transmission.

While flash memory offers a variety of benefits to the end user as discussed supra, employing flash memory also gives rise to several additional problems. Flash memory typically has a long programming and erasing time. The programming of a memory cell can often take milliseconds to reach a required charge level on the floating gate on the transistor. In addition, over-erasing often negatively impacts flash memory because an excessive charge is removed from the floating gate of the memory cell. Corrective programming often has to be employed to mitigate the damage caused by over-erasing.

Figure 4:
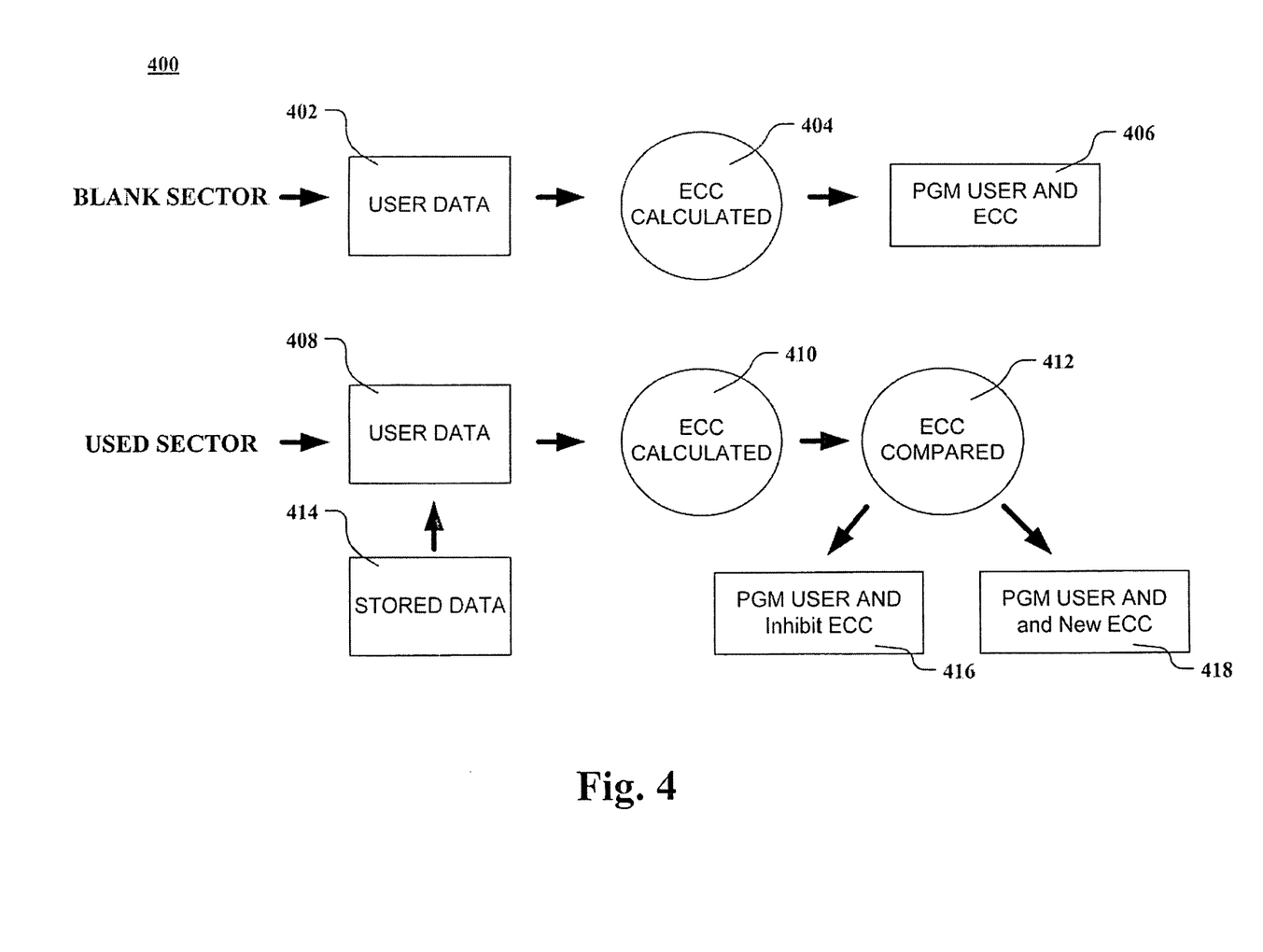
FIG. 4 is a flow chart for an exemplary method of recycling ECC, according to an aspect of the present disclosure.

Referring now to FIG. 4 is illustrated another embodiment of the present disclosure in a flow diagram. To start with, a user puts in so many bytes into a blank sector of memory 402. For certain amounts of bytes (for example, 64, 512, etc.,) an ECC word or a syndrome corresponds to it with about 9 to 24 bits used to do a repair later on. The following chart depicts the typical number of bits required for repair corresponding to the length of the syndrome:

| Word Size | Check bits | Total Size | Percent Overhead |
|---|---|---|---|
| 8 | 4 | 12 | 50 |
| 16 | 5 | 21 | 31 |
| 32 | 6 | 38 | 19 |
| 64 | 7 | 71 | 11 |
| 128 | 8 | 136 | 6 |
| 256 | 9 | 265 | 4 |
| 512 | 10 | 522 | 2 |

The method 400 of the present disclosure begins at the user data 402 being stored into a blank sector, as illustrated in FIG. 4. Upon storing user data 402 into a memory block, ECC is calculated by any means capable of calculating ECC into user information and/or a user data word. At the calculating 404, ECC calculating may implement calculating detection and/or correction by any means possible. At the same step an ECC syndrome is formed. At 406 the ECC syndrome programmed into the user data is stored. The ECC with corresponding data remains to be used for potential recycling of the same ECC as envisioned by the inventors of the present invention, in addition to any other transmission functions inherent to memory operations involving a channel. When data is inputted again at 408 into the now used sector of memory the new data is combined with the older stored core data and core ECC 414, which is to be re-encoded according to the expected ECC outputted by an ECC encoder (not shown). At 410 ECC is calculated by any means capable of calculating ECC into user information and/or a user data word. At the calculating 410, ECC calculating may implement calculating detection and/or correction by any means possible. In another embodiment of the invention, ECC comparison occurs at 412 wherein the existing ECC codeword or syndrome is compared to the new requested updated data for ECC and determines whether or not ECC can still be supported or not. For example, after looking at the new ECC codeword at 412 the method will compare it to the previous one for that block of data and in some instances advance an update to the ECC code word with the new one. At other times this will not be possible in which case generally the ECC will be disabled.

As another embodiment of the present disclosure, the ECC at 416 will therein be inhibited in the present method. The inhibition process comprises programming an indicator bit associated to the ECC chunk. The core ECC parity data is inhibited to prevent subsequent use of the ECC. It is no longer an option for future comparison of any new ECC outputted by an ECC encoder. The core ECC parity is therefore labeled as inhibited wherein the programming of the indicator bit actuates this inhibit label. The indicator bit programmed is associated to the particular ECC chunk of data and causes the ECC to be rendered abandoned for any subsequent programming. The inhibit bit removes ECC parity bits from future programs and reads. There continues to be only one ECC word while active and it always represents the sum of data at the current time.

In yet another embodiment of the invention, the ECC method flows to 418 wherein ECC is not inhibited. At 418 the user data and new ECC is programmed and reliably secured for transmission or operation. According to another embodiment of the disclosure, if the decision at 412 determines that data in the core ECC parity compared to the generated ECC parity code was flawed and correction is possible by programming programmed data over erased data (i.e., a '1' data over a '0' data) then the decision flows to 418 to instigate programming the ECC parity code with new data to the core ECC parity. At 418 of FIG. 4, the new ECC parity code is programmed to the core ECC parity.

One advantage of re-using ECC parity is that extra parity bits are not needed all the time and these bits can be used for data, and therefore speed up transmission. Statistically, the method 400 will get 50% better ECC coverage on the whole than any method without recycle. In alternative methods it is common to loose ECC every time a reprogram occurs, but if not continual support is capable. Prior designs for multiple program, or bit twiddling in NOR structures did not have ECC. Prior methods would limit the size of reprogramming. For example, for NAND program granularity would be limited to match the ECC granularity. Therefore, if the ECC size is 64 bytes or 256 bytes, for example, a user would be able to reprogram, but limited in manner because not within the same number of bytes. The area a user wants to reprogram is generally only 3-4% of the die. Therefore, a user would not have to change his code and still get benefit of that code to the extent that it helps reliability considerably.

In flash memory once a bit is programmed or set to a zero you cannot write a '1' to it independently without erasing the entire array and writing it back. When writing pieces of data at a time this becomes an obvious problem. For example, a blank memory sector may hold 64 bytes. Then when a user writes the first 32 bytes, for example, an ECC word will be calculated into the 32 bytes. For example, if '5 5' gets written into the memory the data bytes for '9 9' get stored into the ECC word chunk and the main data is then stored. Afterwards, when the user programs the upper 32 bytes of data and the flash is full, but when new ECC word chunk is calculated three main actions may occur. Upon comparison of the new ECC data with the old '5 5; could still be the ECC word; Alternatively, it could be F F or something not able to be supported at all by the data and '9 9' may no longer be able to be supported with the new data because already has zeros in it. As yet another alternative, if have a '5 4' or '5 0' support of the ECC is still possible b/c can program in more zeros to still utilize a valid and reliable ECC.

The present disclosure is not constrained to any one method of calculating ECC. Calculation of ECC may be done by any means feasible and the scope of the disclosure is not meant to be restricted to the simple and basic, although commonly used Hamming algorithm for Flash memory. For example, Reed Solomon Coding, Reed Solomon in conjunction with Euclid's algorithm to provide recursion, BCH (Bose, Chaudhuri, Hocquenghem) code, modulation codes and all classes of constrained codes, concatenation and reversed concatenation codes, turbo and low density parity codes, spectrum shaping codes, etc., may be utilized in the calculation of ECC syndrome data. Re-encoding ECC by using the same ECC chunk can also implement any calculating necessary for implementing new ECC data into the same ECC data chunk. For example, in a 128 bit data block transmission, when at an output of an error detection/correction algorithm after a transmission or operation there is either a bit error or not. No action is taken at the output of a hamming algorithm, for example, regarding detecting and correcting for error if no error is detected. However, if an error is present the algorithm can encode an 8 bit parity, for example. The present method has nothing to do with the algorithm because the same method applies to almost any type of ECC. All ECC has a code word or syndrome that attaches with it, and this does not need to be restricted to parity either.

Figure 5:
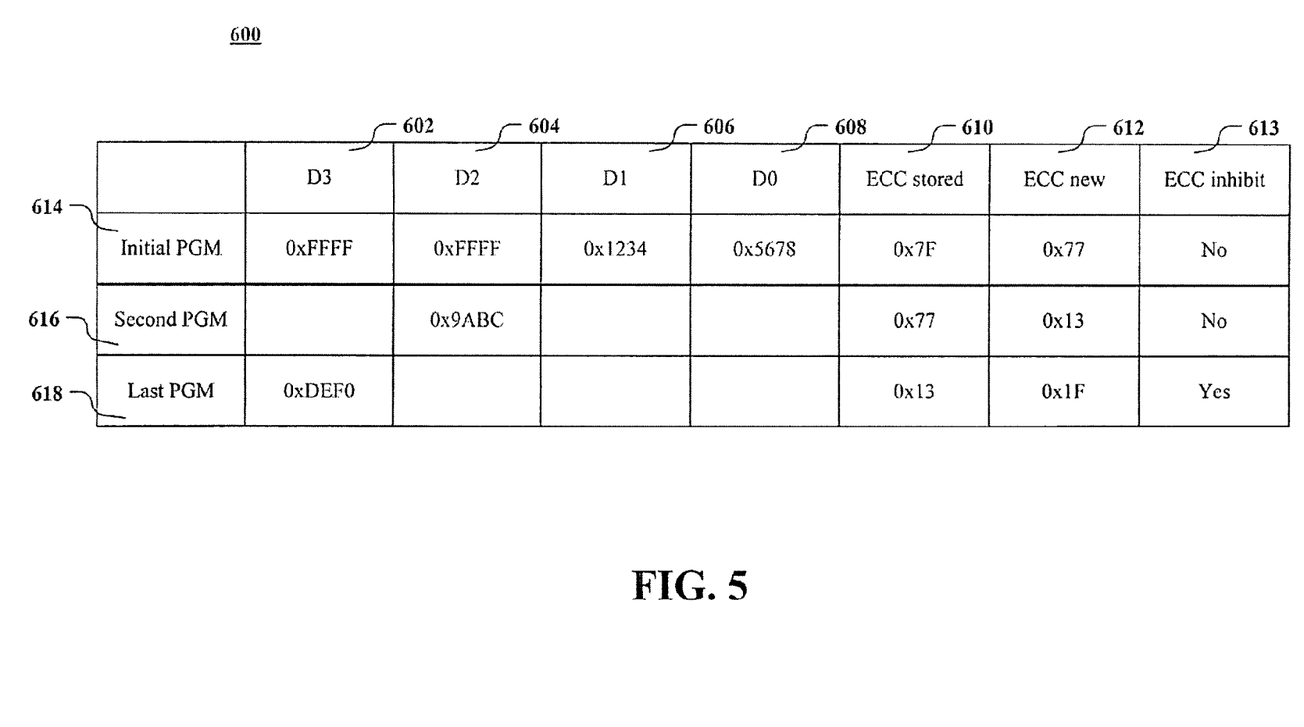
FIG. 5 is a chart for an exemplary method of ECC re-use, according to an aspect of the present disclosure.

FIG. 5 illustrates another embodiment of a method 600 of the present disclosure wherein ECC gets inhibited for re-use at the last program 618. The ECC codeword gets inhibited when a new ECC 612 code bit requires programming from a '0' to a '1' during a new ECC code program 612 to the old or stored ECC code 610. The initial program 614 of user data to a memory array begins with data words D3 602, D2 604, D1 606, D0 608 that in the example illustrated contains words 0xFFFF, 0xFFF, 0x1234, and 0x5678, respectively. The ECC already stored 610 comprises the parity bit data 0x7F and ECC new 612 contains 0x77. Because the old ECC chunk 610 is compatible with the new ECC 612 chunk then no inhibition at 613 is enabled to prevent correction of the core or stored the ECC. Therefore, when a second program 616 occurs and the word 0x9ABC is programmed into the same block of the same length at D2 604 then the ECC stored 610 is now the same as the previous ECC new 612 and therein is recalled for comparison between the new ECC 612 for the second program operation 616. Once again, if the new ECC word 612 expected is compatible with the old (i.e., a '0' data may be programmed over a '1' data to make the ECC useable in conjunction with the old ECC data 610). Therefore, no inhibition occurs at 613 for the second program 616 and recycling of the ECC occurs. However, if in a program operation, for example in the last program 618 of user data, the old ECC 610 is not able to be utilized for re-use and therein the ECC of the stored core gets inhibited and not used in any correction. The inhibition occurs when an attempt is made to write an erased data over a programmed data.

Figure 6:
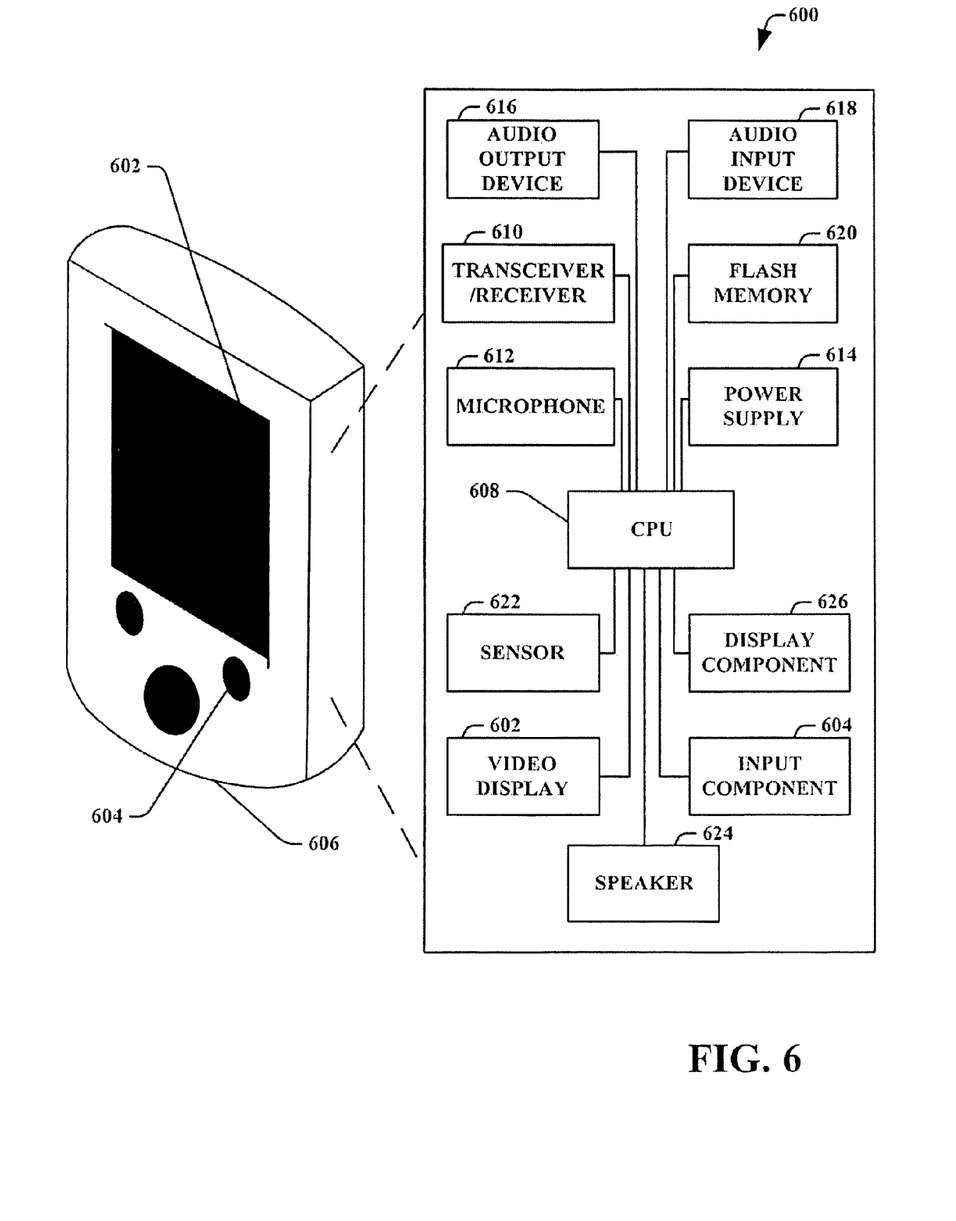
FIG. 6 is an isometric view of a device and block diagram according to yet one or more aspects of the present disclosure.

FIG. 6 is an exemplary portable electronic device, for example, a Personal Data Assistant (PDA) 600 comprising a video display 602, an input component 604, a housing 606, a CPU 608, a transceiver and/or a receiver 610, a microphone 612, a power supply 614, an audio output device 616, an audio input 618, flash memory 620, various sensors 622, and speaker(s) 624. The flash memory 620 utilizing dual bit and single bit memory devices manufactured with improved methods for recycling unused ECC parity bits during flash programming, per the present invention. The audio input device 618 can be a transducer, for example. The input component 604 can include a keypad, buttons, dials, pressure keys, and the like. The video display 602 can be a liquid crystal display, a plasma display, an LED display, and the like, for displaying visual data and information. In accordance with another embodiment of the claimed subject matter, the portable device with flash memory 620 manufactured according to the present invention, comprises cell phones, memory sticks, flash drive devices, video camcorders, voice recorders, USB flash drives, fax machines, flash memory laptops, MP3 players, digital cameras, home video game consoles, hard drives, memory cards (used as solid-state disks in laptops), and the like. The flash memory 620 can include random access memory, read only memory, optical memory, audio memory, magnetic memory, and the like.

Although the invention has been shown and described with respect to one or more implementations, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for recycling error correction code (ECC) during flash memory programming, comprising:
    calculating a first ECC syndrome from a first user data;
    storing the syndrome with the first user data into a memory as stored data;
    calculating a second ECC syndrome from both the stored data and a second user data;
    comparing the second syndrome with the first syndrome;
    determining if the first syndrome is able to be recycled based upon the comparison; and
    selectively re-encoding the first ECC syndrome if determined that the first syndrome is able to be recycled.

2. The method of claim 1, further comprising indicating that the first ECC syndrome has failed and not able to be recycled if a '1' bit would be programmed over by a '0' bit.

3. The method of claim 2, wherein indicating that the first ECC syndrome has failed comprises programming an indicator bit associated with the first ECC.

4. The method of claim 1, further comprises inhibiting use of the first ECC syndrome if determined it is not able to be recycled by programming an indicator bit.

5. The method of claim 4, wherein the indicator bit inhibits use of the first ECC syndrome of the first user data and wherein the first syndrome is the syndrome stored most recently prior to calculating the second ECC syndrome.

6. The method of claim 1, wherein selectively re-encoding the first ECC syndrome comprises programming a '0' bit and not a '1' bit.

7. The method of claim 1, wherein selectively re-encoding the first ECC syndrome comprises programming a '0' bit to a '1' bit when it is able to be recycled.

8. The method of claim 1, further comprises not re-encoding the first ECC syndrome with the second ECC syndrome when a programmed data would be programmed over by an erase data.

9. The method of claim 1, wherein storing the user data in the memory cells further comprises storing verified ECC parity code data and wherein the memory is a volatile memory or SRAM memory.

10. The method of claim 1, wherein the first ECC syndrome is a core ECC parity that corresponds to the first user data and wherein the first syndrome is the most recent syndrome stored prior to calculating the second ECC syndrome.

11. A method of recycling unused error correction code (ECC) bits during flash programming, comprising:
    programming a first data into first ECC parity bits to form a stored data block; and
    selectively re-encoding the first ECC parity bits based on the most recently stored data block and a second data.

12. The method of claim 11, wherein selectively re-encoding comprises programming an erased data with a programmed data and abandoning re-encoding if a programmed data will be programmed with an erased data.

13. The method of claim 12, wherein abandoning re-encoding comprises programming an indicator bit associated with the ECC parity bits to inhibit the use of the ECC parity bits for recycling.

14. The method of claim 12, wherein selectively re-encoding ECC parity bits further comprises:
    generating second ECC parity bits based on the stored data block and second data; and
    verifying the second ECC parity bits are able to recycle the first ECC parity bits by comparing the second ECC parity bits with the stored data block.

15. The method of claim 14, wherein verifying comprises programming an indicator bit if the first ECC parity bits cannot be selectively re-encoded.

16. The method of claim 14, wherein the second ECC is an expected ECC parity data based on the second data and the stored data block, and is an output of an ECC encoder.

17. The method of claim 16, wherein the indicator bit inhibits the use of an associated ECC parity.

18. The method as set forth in claim 16, further comprises selectively re-encoding a '1' over a '0' second data into the first ECC parity comprises programming a '1' over a '0'.

19. The method of claim 11, wherein selectively re-encoding comprises programming a '1' bit over a '0' bit and detecting if a '0' bit would be programmed over a '1' bit.

20. A communication device, comprising:
    a flash memory CPU;
    a flash memory operatively coupled to the flash memory CPU and configured to transfer data to and from the flash memory CPU;
    an input component for entering the data;
    a display component for displaying information;
    a plurality of switches;
    flash memory; and
    a method of recycling unused error correction code (ECC) during flash programming, comprising:
    calculating a first ECC syndrome from a first user data;
    storing the syndrome with the first user data into a memory as stored data;
    calculating a second ECC syndrome from both the stored data and a second user data;
    comparing the second syndrome with the first syndrome;
    determining if the first syndrome is able to be recycled based upon the comparison; and
    selectively re-encoding the first ECC syndrome if determined that the first syndrome is able to be recycled.

* * * * *